(12) United States Patent
Cue et al.

(10) Patent No.: US 9,715,500 B2
(45) Date of Patent: Jul. 25, 2017

(54) METHOD AND SYSTEM FOR SHARING PLAYLISTS

(75) Inventors: Eddy Cue, Mountain View, CA (US); Robert Kondrk, Mountain View, CA (US); Patrice Gautier, San Francisco, CA (US); Jeffrey L. Robbin, Los Altos, CA (US); David Heller, San Jose, CA (US)

(73) Assignee: APPLE INC., Cupertino, CA (US)

( * ) Notice: Subject to any disclaimer, the term of this patent is extended or adjusted under 35 U.S.C. 154(b) by 1793 days.

(21) Appl. No.: 10/833,879

(22) Filed: Apr. 27, 2004

(65) Prior Publication Data

US 2005/0240494 A1    Oct. 27, 2005

(51) Int. Cl.
G06F 17/30 (2006.01)
G06Q 10/10 (2012.01)
G06Q 30/02 (2012.01)
G06Q 30/06 (2012.01)
G06F 3/0482 (2013.01)
G06F 3/0484 (2013.01)
H04L 29/06 (2006.01)

(52) U.S. Cl.
CPC ...... *G06F 17/30053* (2013.01); *G06F 3/0482* (2013.01); *G06F 3/0484* (2013.01); *G06Q 10/107* (2013.01); *G06Q 30/02* (2013.01); *G06Q 30/0203* (2013.01); *G06Q 30/0245* (2013.01); *G06Q 30/06* (2013.01); *G06Q 30/0601* (2013.01); *G06Q 30/0603* (2013.01); *G06Q 30/0625* (2013.01); *G06Q 30/0643* (2013.01); *H04L 67/42* (2013.01)

(58) Field of Classification Search
USPC ............... 707/104.1, 100, 2, 10, 3; 709/217, 709/204–206; 705/28, 51, 26, 35; 725/61; 340/825.25; 84/609
See application file for complete search history.

(56) References Cited

U.S. PATENT DOCUMENTS

| 3,990,710 A | 11/1976 | Hughes |
| 4,528,643 A | 7/1985 | Freeny, Jr. |
| 4,851,931 A | 7/1989 | Parker et al. |
| 5,168,481 A | 12/1992 | Culbertson et al. |

(Continued)

FOREIGN PATENT DOCUMENTS

| EP | 0 917 077 | 5/1999 |
| EP | 0 982 732 | 3/2000 |

(Continued)

OTHER PUBLICATIONS

Breen, Christopher, '*Mixing it up*' (online), Sep. 17, 2004 (retrieved on Nov. 29, 2005) http://playlistmag.com/help/2004/09/imixhowto/index.php.

(Continued)

*Primary Examiner* — Etienne Leroux
(74) *Attorney, Agent, or Firm* — Polsinelli LLP (57) ABSTRACT

Methods and systems for publishing a playlist are disclosed. A user generates or selects a playlist, which is then provided (e.g., uploaded) for publishing. A playlist identifying at least one of one or more tracks and one or more albums is received. The playlist may then be published such that the playlist is viewable by one or more individuals. A user may then purchase one or more tracks/albums identified in the playlist via an online store.

56 Claims, 7 Drawing Sheets

(56) References Cited

U.S. PATENT DOCUMENTS

| | | |
|---|---|---|
| 5,181,107 A | 1/1993 | Rhoades |
| 5,191,573 A | 3/1993 | Hair |
| 5,341,350 A | 8/1994 | Frank et al. |
| 5,355,302 A | 10/1994 | Martin et al. |
| 5,418,713 A | 5/1995 | Allen |
| 5,428,735 A | 6/1995 | Kahl et al. |
| 5,481,509 A | 1/1996 | Knowles |
| 5,504,852 A | 4/1996 | Thompson-Rohrlich |
| 5,559,945 A | 9/1996 | Beaudet et al. |
| 5,561,604 A | 10/1996 | Buckley et al. |
| 5,566,353 A | 10/1996 | Cho et al. |
| 5,583,993 A | 12/1996 | Foster et al. |
| 5,587,404 A | 12/1996 | Kroner et al. |
| 5,616,876 A | 4/1997 | Cluts |
| 5,633,839 A | 5/1997 | Alexander et al. |
| 5,640,566 A | 6/1997 | Victor et al. |
| 5,666,530 A | 9/1997 | Clark et al. |
| 5,710,922 A | 1/1998 | Alley et al. |
| 5,714,971 A | 2/1998 | Shalit et al. |
| 5,721,949 A | 2/1998 | Smith et al. |
| 5,726,909 A | 3/1998 | Krikorian |
| 5,727,202 A | 3/1998 | Kucala |
| 5,734,823 A | 3/1998 | Saigh et al. |
| 5,739,451 A | 4/1998 | Winksy et al. |
| 5,740,134 A | 4/1998 | Peterson |
| 5,819,160 A | 10/1998 | Foladare et al. |
| 5,835,721 A | 11/1998 | Donahue et al. |
| 5,835,732 A | 11/1998 | Kikinis et al. |
| 5,845,282 A | 12/1998 | Alley et al. |
| 5,864,868 A | 1/1999 | Contois |
| 5,875,110 A | 2/1999 | Jacobs |
| 5,897,642 A | 4/1999 | Capossela et al. |
| 5,918,213 A | 6/1999 | Bernard et al. |
| 5,918,303 A | 6/1999 | Yamaura et al. |
| 5,923,757 A | 7/1999 | Hocker et al. |
| 5,925,843 A | 7/1999 | Miller et al. |
| 5,926,819 A | 7/1999 | Doo et al. |
| 5,963,916 A | 10/1999 | Kaplan |
| 5,969,283 A | 10/1999 | Looney et al. |
| 5,983,069 A | 11/1999 | Cho et al. |
| 5,995,098 A | 11/1999 | Okada et al. |
| 6,000,000 A | 12/1999 | Hawkins et al. |
| 6,006,274 A | 12/1999 | Hawkins et al. |
| 6,038,199 A | 3/2000 | Pawlowski et al. |
| 6,041,023 A | 3/2000 | Lakhansingh |
| 6,052,797 A | 4/2000 | Ofek et al. |
| 6,061,306 A | 5/2000 | Buchheim |
| 6,125,369 A | 9/2000 | Wu et al. |
| 6,172,948 B1 | 1/2001 | Keller et al. |
| 6,208,044 B1 | 3/2001 | Viswanadham et al. |
| 6,216,131 B1 | 4/2001 | Liu et al. |
| 6,243,328 B1 | 6/2001 | Fenner et al. |
| 6,243,725 B1 | 6/2001 | Hempleman et al. |
| 6,247,135 B1 | 6/2001 | Feague |
| 6,248,946 B1* | 6/2001 | Dwek ............................ 84/609 |
| 6,255,961 B1* | 7/2001 | Van Ryzin et al. ...... 340/825.25 |
| 6,272,545 B1 | 8/2001 | Flanagin et al. |
| 6,283,764 B2 | 9/2001 | Kajiyama et al. |
| 6,295,541 B1 | 9/2001 | Bodnar et al. |
| 6,332,175 B1 | 12/2001 | Birrell et al. |
| 6,338,044 B1 | 1/2002 | Cook et al. |
| 6,341,316 B1 | 1/2002 | Kloba et al. |
| 6,356,971 B1 | 3/2002 | Katz et al. |
| 6,380,947 B1 | 4/2002 | Stead |
| 6,389,467 B1 | 5/2002 | Eyal |
| 6,407,750 B1 | 6/2002 | Gioscia et al. |
| 6,434,680 B2 | 8/2002 | Belknap et al. |
| 6,446,080 B1 | 9/2002 | Van Ryzin et al. |
| 6,452,609 B1 | 9/2002 | Katinsky et al. |
| 6,453,281 B1 | 9/2002 | Walters et al. |
| 6,490,432 B1 | 12/2002 | Wegener et al. |
| 6,493,758 B1 | 12/2002 | McLain |
| 6,523,124 B1 | 2/2003 | Lunsford et al. |
| 6,529,804 B1 | 3/2003 | Draggon et al. |
| 6,563,769 B1 | 5/2003 | Van Der Meulen |
| 6,587,403 B1 | 7/2003 | Keller et al. |
| 6,587,404 B1 | 7/2003 | Keller et al. |
| 6,621,768 B1 | 9/2003 | Keller et al. |
| 6,636,873 B1 | 10/2003 | Merchant et al. |
| 6,664,981 B2 | 12/2003 | Ashe et al. |
| 6,665,803 B2 | 12/2003 | Lunsford et al. |
| 6,718,348 B1 | 4/2004 | Novak et al. |
| 6,721,489 B1 | 4/2004 | Benyamin et al. |
| 6,731,312 B2 | 5/2004 | Robbin |
| 6,760,721 B1 | 7/2004 | Chasen et al. |
| 6,763,345 B1* | 7/2004 | Hempleman ..... G06F 17/30038 |
| 6,779,019 B1 | 8/2004 | Mousseau et al. |
| 6,785,542 B1 | 8/2004 | Blight et al. |
| 6,794,566 B2 | 9/2004 | Pachet |
| 6,801,964 B1 | 10/2004 | Mahdavi |
| 6,868,440 B1* | 3/2005 | Gupta ............... G06F 17/30017 |
| | | 348/E7.071 |
| 6,874,037 B1 | 3/2005 | Abram et al. |
| 6,928,433 B2 | 8/2005 | Goodman et al. |
| 6,933,433 B1 | 8/2005 | Porteus et al. |
| 6,941,324 B2 | 9/2005 | Plastina et al. |
| 6,978,127 B1 | 12/2005 | Bulthuis et al. |
| 6,987,221 B2 | 1/2006 | Platt |
| 7,003,495 B1 | 2/2006 | Burger et al. |
| 7,043,477 B2 | 5/2006 | Mercer et al. |
| 7,055,165 B2 | 5/2006 | Connelly |
| 7,111,009 B1 | 9/2006 | Gupta et al. |
| 7,117,516 B2 | 10/2006 | Khoo et al. |
| 7,126,770 B1 | 10/2006 | Arai et al. |
| 7,171,557 B2 | 1/2007 | Kallahalla et al. |
| 7,209,633 B1 | 4/2007 | Novak et al. |
| 7,228,298 B1* | 6/2007 | Raines ............................ 707/3 |
| 7,272,385 B2 | 9/2007 | Mirouze et al. |
| 7,478,323 B2 | 1/2009 | Dowdy |
| 7,502,626 B1 | 3/2009 | Lemilainen |
| 7,797,446 B2 | 9/2010 | Heller et al. |
| 2001/0004310 A1 | 6/2001 | Kono |
| 2001/0011308 A1 | 8/2001 | Clark et al. |
| 2001/0018858 A1* | 9/2001 | Dwek ............................ 84/609 |
| 2001/0021053 A1 | 9/2001 | Colbourne et al. |
| 2001/0041021 A1 | 11/2001 | Boyle et al. |
| 2001/0044835 A1 | 11/2001 | Schober et al. |
| 2001/0048642 A1 | 12/2001 | Berhan |
| 2001/0052123 A1 | 12/2001 | Kawai |
| 2002/0002413 A1 | 1/2002 | Tokue |
| 2002/0010788 A1 | 1/2002 | Nathan et al. |
| 2002/0013784 A1 | 1/2002 | Swanson |
| 2002/0016968 A1 | 2/2002 | Nathan et al. |
| 2002/0046315 A1 | 4/2002 | Miller et al. |
| 2002/0055934 A1 | 5/2002 | Lipscomb et al. |
| 2002/0073167 A1* | 6/2002 | Powell et al. ................. 709/217 |
| 2002/0080180 A1 | 6/2002 | Mander et al. |
| 2002/0116082 A1 | 8/2002 | Gudorf |
| 2002/0118300 A1* | 8/2002 | Middleton et al. ........... 348/569 |
| 2002/0133515 A1 | 9/2002 | Kagle et al. |
| 2002/0138606 A1 | 9/2002 | Robison |
| 2002/0152278 A1* | 10/2002 | Pontenzone et al. ......... 709/217 |
| 2002/0161865 A1 | 10/2002 | Nguyen |
| 2002/0174021 A1* | 11/2002 | Chu et al. ....................... 705/26 |
| 2002/0174269 A1 | 11/2002 | Spurgat et al. |
| 2002/0194195 A1 | 12/2002 | Fenton et al. |
| 2002/0194309 A1 | 12/2002 | Carter et al. |
| 2003/0013493 A1 | 1/2003 | Irimajiri et al. |
| 2003/0014767 A1* | 1/2003 | Stumphauzer, II ........... 725/131 |
| 2003/0028539 A1 | 2/2003 | Nunome et al. |
| 2003/0029914 A1* | 2/2003 | Hortman et al. .............. 235/383 |
| 2003/0030733 A1 | 2/2003 | Seaman et al. |
| 2003/0037254 A1 | 2/2003 | Fischer et al. |
| 2003/0046434 A1 | 3/2003 | Flanagin et al. |
| 2003/0050058 A1 | 3/2003 | Walsh et al. |
| 2003/0055723 A1 | 3/2003 | English |
| 2003/0074457 A1 | 4/2003 | Kluth |
| 2003/0079038 A1 | 4/2003 | Robbin et al. |
| 2003/0081784 A1 | 5/2003 | Kallahalla et al. |
| 2003/0093340 A1* | 5/2003 | Krystek et al. ................. 705/28 |
| 2003/0098893 A1 | 5/2003 | Makinen |
| 2003/0112279 A1 | 6/2003 | Irimajiri |
| 2003/0149628 A1 | 8/2003 | Abbosh et al. |
| 2003/0163399 A1* | 8/2003 | Harper et al. ................. 705/35 |

(56) References Cited

U.S. PATENT DOCUMENTS

| | | |
|---|---|---|
| 2003/0167318 A1 | 9/2003 | Robbin et al. |
| 2003/0182315 A1 | 9/2003 | Plastina et al. |
| 2003/0191756 A1 | 10/2003 | Oh |
| 2003/0206203 A1 | 11/2003 | Ly |
| 2003/0210821 A1 | 11/2003 | Yogeshwar et al. |
| 2003/0221541 A1 | 12/2003 | Platt |
| 2003/0225834 A1* | 12/2003 | Lee et al. .................. 709/204 |
| 2004/0001395 A1 | 1/2004 | Keller et al. |
| 2004/0001396 A1 | 1/2004 | Keller et al. |
| 2004/0017997 A1 | 1/2004 | Cowgill |
| 2004/0027930 A1 | 2/2004 | Kudo |
| 2004/0055446 A1 | 3/2004 | Robbin et al. |
| 2004/0076086 A1 | 4/2004 | Keller et al. |
| 2004/0083480 A1 | 4/2004 | Dodge |
| 2004/0093274 A1* | 5/2004 | Vanska et al. ............... 705/26 |
| 2004/0101287 A1* | 5/2004 | Seo et al. .................... 386/95 |
| 2004/0103102 A1 | 5/2004 | Nelson |
| 2004/0113915 A1 | 6/2004 | Ohtsuki et al. |
| 2004/0123242 A1 | 6/2004 | McKibben |
| 2004/0123725 A1* | 7/2004 | Kim ............................ 84/609 |
| 2004/0128277 A1 | 7/2004 | Mander et al. |
| 2004/0139180 A1 | 7/2004 | White et al. |
| 2004/0148358 A1* | 7/2004 | Singh et al. ............... 709/207 |
| 2004/0162765 A1* | 8/2004 | Reber ........................ 705/26 |
| 2004/0205005 A1 | 10/2004 | Matsunaga |
| 2004/0205028 A1* | 10/2004 | Verosub et al. ............ 705/59 |
| 2004/0223245 A1 | 11/2004 | Morohashi |
| 2004/0225762 A1 | 11/2004 | Poo |
| 2004/0261064 A1 | 12/2004 | Goldstein et al. |
| 2005/0015807 A1* | 1/2005 | Young ........................ 725/86 |
| 2005/0055718 A1* | 3/2005 | Stone ......................... 725/61 |
| 2005/0060264 A1* | 3/2005 | Schrock ............ G11B 27/105 705/51 |
| 2005/0080915 A1 | 4/2005 | Shoemaker et al. |
| 2005/0149392 A1* | 7/2005 | Gold et al. .................. 705/14 |
| 2005/0235015 A1 | 10/2005 | Abanami et al. |
| 2005/0240494 A1 | 10/2005 | Cue et al. |
| 2005/0240661 A1 | 10/2005 | Heller et al. |
| 2005/0249080 A1 | 11/2005 | Foote et al. |
| 2005/0262528 A1 | 11/2005 | Herley et al. |
| 2005/0267803 A1 | 12/2005 | Patel et al. |
| 2005/0278377 A1 | 12/2005 | Mirrashidi et al. |
| 2006/0036567 A1 | 2/2006 | Tan |
| 2006/0163358 A1 | 7/2006 | Biderman |
| 2006/0168340 A1 | 7/2006 | Heller et al. |
| 2006/0247980 A1 | 11/2006 | Mirrashidi et al. |
| 2008/0256378 A1 | 10/2008 | Guillorit |
| 2009/0063496 A1 | 3/2009 | Cunningham et al. |
| 2009/0063543 A1 | 3/2009 | Martin et al. |
| 2010/0042654 A1 | 2/2010 | Heller et al. |

FOREIGN PATENT DOCUMENTS

| | | |
|---|---|---|
| EP | 1 028 425 | 8/2000 |
| EP | 1 056 093 A1 | 11/2000 |
| EP | 1 548 740 | 6/2005 |
| JP | 2000-285656 A | 10/2000 |
| JP | 2000-339917 | 12/2000 |
| JP | 2001-76465 | 3/2001 |
| JP | 2001-93226 | 4/2001 |
| JP | 2001-117800 | 4/2001 |
| JP | 2001/291365 A | 10/2001 |
| JP | 2002/74909 A | 3/2002 |
| JP | 2003-50588 | 2/2003 |
| JP | 2003-51179 | 2/2003 |
| WO | WO 01/33569 | 6/1995 |
| WO | WO 95/16950 | 6/1995 |
| WO | WO 03/038700 A1 | 2/2001 |
| WO | WO 01/67753 | 9/2001 |
| WO | WO 02/25610 | 3/2002 |
| WO | WO 02/25935 | 3/2002 |
| WO | WO 03/023786 | 3/2003 |
| WO | WO 03/025933 | 3/2003 |
| WO | WO 2004-004338 | 1/2004 |
| WO | WO 2004/084413 | 9/2004 |
| WO | WO 2005/014262 | 4/2005 |
| WO | WO 2005/106752 | 4/2005 |
| WO | WO 2005/073856 A2 | 8/2005 |

OTHER PUBLICATIONS

'*i Tunes Celebrates Its First Anniversary; Over 70 Million Songs Purchased*', (online), Apple, Apr. 28, 2004 (retrieved on Nov. 29, 2005) http://www.apple.com/pr/library/2004/apr/28itunes.html.

Kawamoto, et al., '*On 1st Birthday, iTunes Unwraps New Features*' (online) CNET News, Apr. 28, 2004 (retrieved on Nov. 29, 2005) http://news.com.com/On+1st+birthday,+iTunes+unwraps+new+features/2100-1027_3-5201598.html.

PCT application No. PCT/US05/14262, International Search Report mailed Feb. 2, 2006.

PCT application No. PCT/US05/14262, Written Opinion mailed Feb. 2, 2006.

"Replay Gain—A proposed Standard," Oct. 7, 2001, from http://replaygain.hydrogenaudio.org/index.html and http://replaygain.hydrogenaudio.org/outline.html.

"Rio Portable Music Player," Independent Web Review, downloaded Jan. 25, 2002, http://www.webreviews.com/9901/rio.html.

"Hewlett Packard Jornada 525 Color Pocket PC," downloaded Jan. 25, 2002, http://www.pc4d.com/electronics/products/56/jornada_525_color_pocket_pc.shtml.

Fleishman, Glenn, "Handheld iPod joins MP3 band a bit late, but is standout player," Nov. 6, 2001, http://seattletimes.nwsource.com/html/businesstechnology/134361811_ptmacc040.html.

iTunes, Digital Music for your Mac, Apple Computer, Inc., downloaded Oct. 22, 2001, http://www.apple.com/itunes/.

Lindauer, Andy, "What's in your Pocket?," Edgereview, downloaded Jan. 25, 2002, http://www.edgereview.com/print.cfm?Type=aag&ID=286.

U.S. Appl. No. 10/936,233, filed Sep. 7, 2004.

"Apple Announces iTunes 2," Press Release, Apple Computer, Inc., Oct. 23, 2001, http://www.apple.com/pr.library/2001/oct/23itunes.html.

"Apple Introduces iTunes—World's Best and Easiest to Use Jukebox Software," Jan. 9, 2001, http://www.apple.com/pr/library/2001/jan/09itunes.html.

"Apple's iPod Available in Stores Tomorrow," Press Release, Apple Computer, Inc., Nov. 9, 2001.

"Nomad Jukebox," User Guide, Version 1.0, Creative Technology Ltd., Aug. 2000.

"Can You Carry You CD Collection in Your Pocket?," Personal Jukebox, Compaq Computer Corp., downloaded Oct. 13, 2000, http://research.compaq.com/SRC/pjb.

Birrell, Andrew, "Personal Jukebox (PJB)," Oct. 13, 2000, http://birrell.org/andrew/talks/pjb-overview.ppt.

Butler, Travis, "Archos Jukebox 6000 Challenges Nomad Jukebox," Aug. 13, 2001, http://db.tidbits.com/getbits.acgi?tbart=06521.

Butler, Travis, "Portable MP3: The Nomad Jukebox," Jan. 8, 2001, http://db.tidbits.com/getbits.acgi?tbart=06261.

Chakarova et al., "Digital Still Cameras—Downloading Images to a Computer," downloaded May 9, 2005, http://journalism.berkeley.edu/multimedia/tutorials/stillcams/downloading.html.

De Herrera, Chris, "Microsoft ActiveSync 3.1," Version 1.02, Oct. 13, 2000, http://www.cewindows.net/wce/activesync3.htm.

Engst, Adam, "SoundJam Keeps on Jammin'," Jun. 19, 2000, http://db.tidbits.com/getbits.acgi?tbart=05988.

IEEE 1394—Wikipedia, 1995, http://www.wikipedia.org/wiki/Firewire.

iTunes 2, Specification Sheet, Apple Computer, Inc., Oct. 2001.

iTunes v1.0, Playlist Related Help Screens, Apple Computer, Inc., Jan. 2001.

iTunes v2.0, Playlist Related Help Screens, Apple Computer, Inc., Oct. 2001.

Miniman, Jared, "Applian Software's Replay Radio and Player v1.02," Product review, Jul. 31, 2001, http://www.pocketnow.com/reviews/replay/replay.htm.

(56) References Cited

OTHER PUBLICATIONS

Musicmatch, "Musicmatch and Xing Technology Introduce Musicmatch Jukebox," May 18, 1998, http://www.musicmatch.com/info/company/press/releases/?year=1998&release=2.
Negrino, Tom, "SoundJam™ MP Plus MP3 Player and Encoder for Macintosh," SoundJam MP Plus version 2.0, Casady & Greene, Inc., Mar. 2000.
SoundJam MP Plus, Representative Screens, Casady & Greene, Inc., Salinas, CA, 2000.
Steinberg, Gene, "Sonicblue Rio Car," Product Review, Dec. 12, 2000, http://electronics.cnet.com/electronics/0-6342420-1304-4098389.html.
U.S. Appl. No. 10/198,639, filed Jul. 16, 2002.
U.S. Appl. No. 10/833,399, filed Apr. 27, 2004.
U.S. Appl. No. 10/973,925, filed Oct. 25, 2004.
U.S. Appl. No. 11/097,034, filed Apr. 1, 2005.
U.S. Appl. No. 11/097,591, filed Apr. 1, 2005.
International Search Report dated Jul. 9, 2003, from International Application No. PCT/US03/21534.
"About MusicMatch Jukebox," MusicMatch Jukebox v4 Help, pp. 1-4.
Bridgman, "Windows XP Expert Zone Community Columist", Using Windows Mobil-based Portable Media Centers and Windows Media Player 10, Aug. 25, 2004, 1-11.
Compaq Computer Corp., copyright 1991, Personal Jukebox User Manual, pp. 1-29.
Handbook for Palm™ m500 Series Handhelds, User Manual.
Lyra, Personal Digital Player, RCA, Product Box.
RCA Lyra User's Guide, RD2201/2202/2204, www.lyrazone.com, pp. 1-37.
RealJukebox Plus Manual, Real Networks, Inc., copyright 1999, pp. 1-83.
RealJukebox, Real Networks, Inc., webpages downloaded Oct. 27, 2005 http://www.real.com/Jukebox/release_notes.html#.
Sinitsyn, "A Synchronization Framework for Personal Mobile Servers," Proceedings of the Second IEEE Annual Conference on Pervasive Computing and Communications Workshops, Piscataway, NJ, Mar. 14, 2004, pp. 1-4.
TuneBase 100 User Guide, A CD Library Management System, Escient, Inc. copyright 1999.
TuneBase Pro Mk-II User's Guide, Escient, Inc.
Vetro et al., "Media Conversions to Support Mobile Users," IEEE Canadian Conference on Electrical and Computer Engineering, Piscataway, NJ, May 13, 2001, pp. 607-612.
Window's Media Player 6.4, Microsoft Corp., copyright 1999, software available at http://www.oldversion.com/program.php?n=wmp See also Windows Media Player 6.4 Software Official website at http://www.microsoft.com/windows/windowsmedia/player/version64/default.aspx.
Zheng et al., "MobiGATE: a mobile gateway proxy for the active deployment of transport entities," Proceedings of the 2004 International Conference on Parallel Processing, Piscataway, NJ, Aug. 15, 2004.
PBS Local Insertion Server Instruction Manual, Microvision, Inc., pp. 1-71, Jun. 19, 1996.
Wave Station Digital Audio Automation System, Instruction & Operations Manual Broadcast Software International, pp. 1-113, Feb. 4, 1997.
Nielsen et al., "Comparative Design Review: An Exercise in Parallel Design", INTERCHI '93, pp. 414-417, Apr. 24-29, 1993.
Lowery Daryl, "Random-Access Digital Audio—Recording Systems", pp. 68-71, Jun. 1992.
Sadie Master System, Product Brochure, Studio audio Digital Equipment Inc., 2 pgs.
RCS Works-Cart Wall User's Guide and Reference Manual, pp. 1-83, Feb. 7, 1993.

"Digital Audio Just Got Easier!", CartWorks Digital Audio Systems, dbm Systems, Inc.
"CartWorks File Utilities User's Manual", dbm Systems, Inc., pp. 1-8.
"CartWorks MHD Music-on-Hard-Drive QuickSchedule User's Manual", dbm Systems, Inc., pp. 1-8, Feb. 8, 1998.
"CartWorks MHD Music-on-Hard-Drive User's Manual V6.8", dbm Systems, Inc., pp. 1-11.
"CartWorks On-Demand Editor User's Manual", dbm Systems, Inc., pp. 1-7.
"CartWorks Script Editor User's Manual v3.12", dbm Systems, Inc., pp. 1-26.
"CartWorks Spot Set Editor User's Manual", dbm Systems, Inc., pp. 1-11.
"The DADpro Digital Audio Delivery System Operation Manual Version 1.0", IBM Corp., pp. 1-424, Aug. 30, 1996.
"Virtual Recorder—Basic Operations", ASC Audio Video Corporation, pp. 1-94, Sep. 9, 1996.
"Broadcast Tools: SpotBase, Playlist & TapeBase", ASC Audio Video Corporation, pp. 1-2.
"VR 300 Advanced Broadcast Video Server", ASC Audio Video Corporation, pp. 1-9.
"VR300 Video Server User Manual, Version 1.0", ASC Audio Video Corporation, pp. 1-40, Mar. 20, 1998.
"Gravis WinDecks Version 1.12", screen shots, Gravis Computer Technology Ltd., pp. 1-10.
WinDecks, User Instructions, Gravis Computer Technology Ltd., pp. 1-14.
U.S. Appl. No. 11/138,004, filed May 25, 2005.
U.S. Appl. No. 11/114,914, filed Apr. 25, 2005.
U.S. Appl. No. 11/454,060, filed Jun. 14, 2006.
Iriver, "PMP140/120", Sep. 13, 2004, 1-2 pgs.
MG-25, Portable MPEG4 Player (MG-25), Jul. 29, 2004, 1-3 pgs.
Windows XP Service Pack 2, Figures 1-2 and "How to obtain the latest Windows XP service pack," Aug. 25, 2004.
Mabini. MemMaid Review. Pocket PC Dubai, Jul. 23, 2004[online], [retrieved on Mar. 26, 2008]. Retrieved from the Internew <URL: http://www.pocketpcdubai.com/DinarSoft/memmaid_review.html>.
Torrone, Phillip, How-To: Getting Podcasts on a Portable Media Center (and other Windows Media Devices, Oct. 2004.
Communication pursuant to Article 94 (3) EPC for European Patent Application No. 05 739 940.4, dated Jul. 17, 2009.
Office Action for Chinese Patent Application No. 200580018105.9 dated Jan. 29, 2010.
Examiner's First Report for Australian Application No. 2005-239426 dated Nov. 2, 2009.
International search Report and Written Opinion for PCT Application No. PCT/US2005/014262 Mailed Feb. 2, 2006.
Notification of Reason for Refusal for Japanese Patent Application No. 2007-510885 Mailed Aug. 17, 2010.
Communication pursuant to Article 94(3) EPC for European Patent Application 05 739 940.4 dated Jul. 17, 2009.
Personal Jukebox (PJB), "System Research Center and PAAD", Compaq Computer Corp., Oct. 13, 2000, http;//research.compaq.com/SRC/pjb/.
Etchison, "Accelerated Discrete Adjustment of the Parameters of a Process", IBM Technical Disclosure Bulletin, vol. 15, No. 5, Oct. 1, 1972, 2 pgs.
Rejection Decision for Chinese Patent Application No. 200580018105.9, dated Jun. 5, 2012.
Office Action for Chinese Patent Application No. 200580018105.9 dated Dec. 16, 2011.
Office Action for Canadian Patent Application No. 2564735, mailed Jan. 16, 2013.

\* cited by examiner

METHOD AND SYSTEM FOR SHARING PLAYLISTS

BACKGROUND OF THE INVENTION

Field of the Invention

The present invention relates to playlists and, more particularly, to sharing playlists via a central server.

Description of the Related Art

Traditionally, music has been purchased at music stores or music departments of larger stores. A consumer will visit the music store or department and manually browse for albums or compact discs (CDs) of interest. Often, the music in the music store or department is categorized by genre, and then indexed by artist. For example, genre can include rock, country, pop, soul, jazz, etc. After the consumer selects an album or CD of interest, the consumer proceeds to a check-out register to pay for the album or CD being purchased.

In recent years music delivery or distribution over the Internet has become popular. Due to the advances in efficient file formats, such as MP3 and MPEG4, the size of media files have become small enough to make their download via the Internet practical. Also, technological advances have led to higher-speed Internet connections and lower cost of memory. The combination of these advances make downloading media files, such as for music and videos, manageable and not too time consuming.

One popular approach to music distribution is mp3.com which uses a centralized server for storage of the numerous songs that are available for download. Another popular approach to music distribution was Napster in which peer-to-peer sharing was utilized. With peer-to-peer sharing, the numerous songs reside on the user machines of the many users, not on a centralized server.

Various Internet web sites have made it possible to purchase music. In order to purchase goods, the purchaser must typically enter his or her credit card information for each purchase. Some web sites have made it possible for repeat customers to simplify this process by storing the user's credit card information so that this information need not be re-entered for each purchase. This is generally accomplished through a user account.

Unfortunately, it is often difficult for users to identify which songs or albums they have already purchased. In addition, the availability of peer-to-peer sharing has been to a large part eliminated in response to allegations of copyright infringement. As a result, users can no longer share songs or albums among one another.

In view of the above, it would be desirable if users could share music without the risk of copyright infringement.

SUMMARY OF THE INVENTION

The present invention pertains to methods and apparatus for sharing a playlist. Specifically, a user may publish a playlist over a network (e.g., Internet). The disclosed embodiments may be implemented in association with a web site, thereby enabling a user to purchase items in the published playlist (or listen to samples of the items) via the web site.

In the following description, a list that lists one or more tracks (e.g., songs) and/or one or more albums (i.e., a purchasable unit such as a tape or CD) will be referred to as a "playlist." The playlist may be manually or automatically generated. It is important to note that the playlist is a list of attributes of each item (e.g., song) sufficient to identify the item (e.g., on the web site or server), and does not provide unlimited access to the actual content of tracks or albums referenced in the playlist.

In accordance with one aspect of the invention, methods and apparatus for sharing a playlist are disclosed. When a playlist identifying at least one of one or more tracks and one or more albums is received, the playlist may then be published by submitting a request to publish the playlist. The playlist is then published such that it is viewable by one or more individuals.

In accordance with another aspect of the invention, methods and apparatus for sharing a playlist enable the playlist to be made accessible via an online store from which contents of the playlist can be purchased. When the playlist is received, the contents of the playlist are matched against contents of an online store via which tracks and albums can be purchased. Tracks and albums that cannot be purchased from the online store may then be then filtered (i.e., removed) from the playlist. The filtered playlist may then be published, enabling users to purchase tracks and albums identified in the playlist.

In accordance with yet another aspect of the invention, methods and apparatus for sharing a playlist include obtaining a playlist identifying at least one of one or more tracks and one or more albums. The playlist is then published such that the playlist is viewable by one or more individuals. A request with respect to at least one of the one or more tracks and one or more albums is then received. The request may be, for example, a purchase request or search request. For instance, a search may be performed to ascertain those playlists that include a particular track (e.g., song) and/or album.

In accordance with yet another aspect of the invention, methods and apparatus for sharing a playlist include maintaining one or more playlists, each of the playlists identifying at least one of one or more tracks and one or more albums. One or more of the playlists are published such that the published playlists are viewable by one or more individuals. A request with respect to at least one of the tracks/albums associated with one of the playlists may then be received and processed. For instance, the request may be a purchase request or a search request.

The invention also relates to graphical user interfaces that assist users in sharing a playlist, viewing a playlist, performing various searches, and sampling, listening to, or purchasing items listed in a playlist, as well as those that are used to notify a user that the playlist has been published. For instance, a graphical user interface for use in facilitating the publication of a playlist is disclosed. In addition, a graphical user interface for use in purchasing items listed in a playlist is disclosed.

The invention can be implemented in numerous ways, including as a method, system, device, apparatus, graphical user interface, or computer readable medium. Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of various aspects of the invention are discussed below with reference to FIGS. 1-7. However, those skilled in the art will readily appreciate that the detailed description given herein with respect to these figures is for explanatory purposes as the invention extends beyond these limited embodiments.

One aspect of the invention pertains to a system and method for sharing a playlist. In the following description, a list that lists one or more tracks (e.g., songs) and/or one or more albums (i.e., a purchasable unit such as a tape or CD) will be referred to as a "playlist." By publishing a playlist, the playlist may be accessible by one or more individuals. For instance, a hypertext link including a Uniform Resource Locator (URL) to the playlist may be transmitted to one or more individuals. The individuals may then access the playlist by clicking on the link provided in the email. As another example, the playlist may simply be accessible via a web site (e.g., central server). The playlist may be accessible by the public, or merely those who have a particular password or email address.

Another aspect of the invention pertains to a system and method for purchasing items such as tracks or albums that are listed in a playlist (e.g., published playlist) over a network. Specifically, the disclosed embodiments may be implemented in association with a web site supporting a user account such as a publisher or purchaser account, thereby enabling the purchaser to purchase track(s) and/or album(s) via the web site that are listed in the publisher's (or purchaser's) playlist.

Another aspect of the invention enables a potential purchaser to sample and purchase items in a playlist (e.g., if it has been uploaded by the purchaser) or a published playlist. Specifically, the potential purchaser can browse through published playlists identifying media items that are available for purchase. The potential purchaser can thereafter purchase one or more media items on-line with great ease. Upon purchasing a media item, the content for the media item can be downloaded over the network to the purchaser. The content for the media item is then encrypted for the purchaser's use and stored on the purchaser's machine. Thereafter, the purchaser can make use of the media item (e.g., play the media item).

Still another aspect of the invention pertains to a graphical user interface suitable for assisting users in uploading a playlist, publishing a playlist, and purchasing items from a playlist, as well as those that notify a recipient that a playlist has been published.

Figure 1:
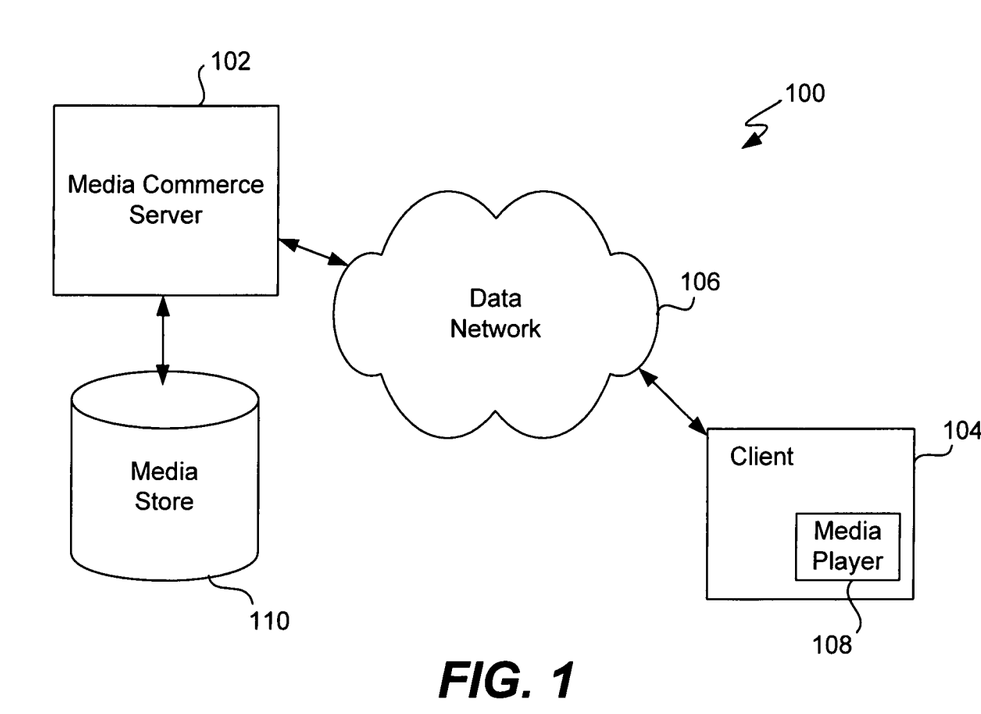
FIG. 1 is a block diagram of a media purchase system according to one embodiment of the invention.

FIG. 1 is a block diagram of a media purchase system 100 according to one embodiment of the invention. The media purchase system 100 includes a media commerce server 102. The media commerce server 102 coordinates review and/or purchase of media items through on-line transactions. On-line transactions to purchase media items is also referred to as electronic commerce (e-commerce). The media purchase system 100 also includes a client 104. Typically, the media purchase system 100 would include a plurality of different clients 104. Each client 104 includes a media player 108. The media player 108 is an application program (e.g., software application) that operates on the client 104, which is a computing device. The client 104 is coupled to the media commerce server 102 through a data network 106. Hence, any of the clients 104 can interact with the media commerce server 102 to review and/or purchase media items. In one embodiment, the data network 106 includes at least a portion of the Internet. The clients 104 can vary with application but generally are computing devices that have memory storage. Often, the clients 104 are personal computers or other computing devices that are capable of storing and presenting media to their users.

The media purchase system 100 also includes a media store 112. The media store 112 provides mass storage of the numerous media items that are available for purchase via the media purchase system 100. In addition, the media store 112 may provide storage for one or more playlists that have been uploaded and/or published. Once purchased (e.g., via selection from a playlist), the media items can be accessed from the media store 112 over the data network 106 by way of the media commerce server 110.

More particularly, the media purchase system 100 allows a user of the client 104 to utilize the media player 108 to browse, search or sort through a plurality of playlists identifying one or more media items (e.g., tracks/songs or albums) that can be purchased from the media commerce server 102. The media player 108 may also allow the user to preview a media clip (i.e., sample) of the media items (e.g., songs). In the event that the user of the media player 108 desires to purchase a particular media item, the user (via the media player 108) and the media commerce server 102 engage in an on-line commerce transaction in which the user pays for access rights to the particular media item. In one embodiment, a credit card associated with the user is credited for the purchase amount of the particular media item.

In the media purchase system 100, the media items are stored in the media store 112 and retrieved via the media commerce server 102. However, a separate media storage server could additionally be provided and coupled between the data network 106 and the media store 110. The benefit of such a media storage server would be that the media commerce server 102 need not burden its resources to deliver any of the media items that may be purchased to the client 104. Instead, on purchasing a particular media item, the media commerce server 102 sends download information to the media player 108 on the client 104. The download information can then be used by the media player 108 (and the client 104) to retrieve the media content for the particular media item by interacting with the media storage server through the data network 106. In this regard, the media storage server obtains the media content corresponding to the particular media item from the media store 112 and downloads such content through the data network 106 to the client 104. The downloaded media content can then be stored on the client 104. In one embodiment, the downloaded media content is encrypted as received at the client 104 but is decrypted and then re-encrypted before persistent storage on the client 104. Thereafter, the media player 108 can present (e.g., play) the media content at the client 104. In addition, media search processing/browsing may be performed by an application program operating on a client. The application program is, for example, the media player 108 illustrated in FIG. 1.

Here, in one example, the media commerce server 102 illustrated in FIG. 1 can also serve as the media storage server. However, it is important to note that these functions may be implemented in separate servers. The search request may be a request to the remote media server to perform a search in accordance with the search criteria for a particular song or album. For instance, the search may request access to published playlists including a particular song or album. The user may then choose to purchase some or all songs or albums in a particular playlist. Here, the media commerce server 102 includes at least information (e.g., metadata) for a large number of media items that are available to be purchased from the media commerce server 102, though the content of the media items that are purchased may be acquired at the client via download with respect to another remote server, such as the media storage server.

The connections through the data network 106 between the media commerce server 102, the client 104 and the media storage server can be through secure connections, such as Secure Sockets Layer (SSL). Further, the media content may be re-encrypted prior to storage at the client 104 such that downloaded media content is not stored in the clear, but is instead stored in an encrypted manner.

Figure 2:
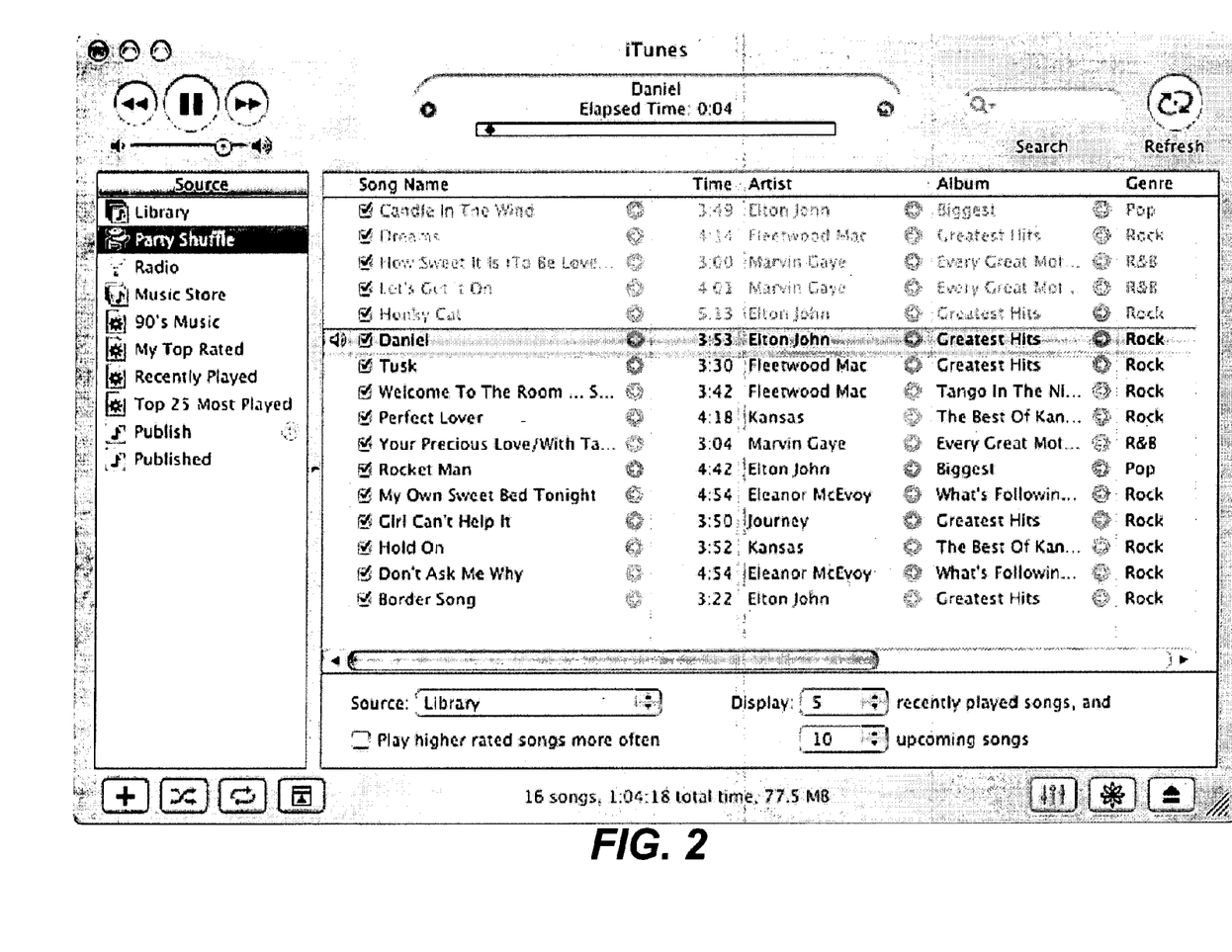
FIG. 2 is an exemplary graphical user interface for publishing a playlist and viewing a published playlist in accordance with one embodiment of the invention.

FIG. 2 is an exemplary graphical user interface for publishing a playlist and viewing a published playlist in accordance with one embodiment of the invention. As shown in FIG. 2, various playlists may be generated. As shown, the "Source" may be a playlist that has been placed in the user's "Library," such as the "Party Shuffle" playlist. Other playlists may also be generated, such as the "90's Music" and "My Top Rated" playlists. Thus, a user may select a preexisting playlist. A playlist may be manually or automatically generated. Automatic generation may include a generation based upon one or more criteria (e.g., genre, artist).

In order to publish a playlist identifying one or more tracks and/or albums, the playlist is first obtained. Specifically, the playlist is uploaded for publishing. In this example, the playlist "Party Shuffle" has been uploaded for publishing. As can be seen from this example, a playlist includes one or more tracks (e.g., songs) and/or albums. For each entry in the playlist (e.g., song), the name is identified. For each song, the artist is also identified. In addition, an album name, genre, play time and personal rating (not shown) may also be identified in a playlist entry for a track such as a song. For instance, the genre may be pop, rock, or R&B. Although songs are identified in the exemplary playlist, other entries may also be identified. For instance, an entry may merely identify a track or, alternatively, an album.

When the playlist is received, the playlist may then be published for access by one or more additional users. The contents of the playlist may be published in the order in which the contents are listed in the uploaded playlist. Publishing may merely involve publishing all text contents of a playlist, such as those set forth above. However, the playlist may also be filtered prior to publishing, as will be described in further detail below with reference to FIG. 3.

Figure 3:
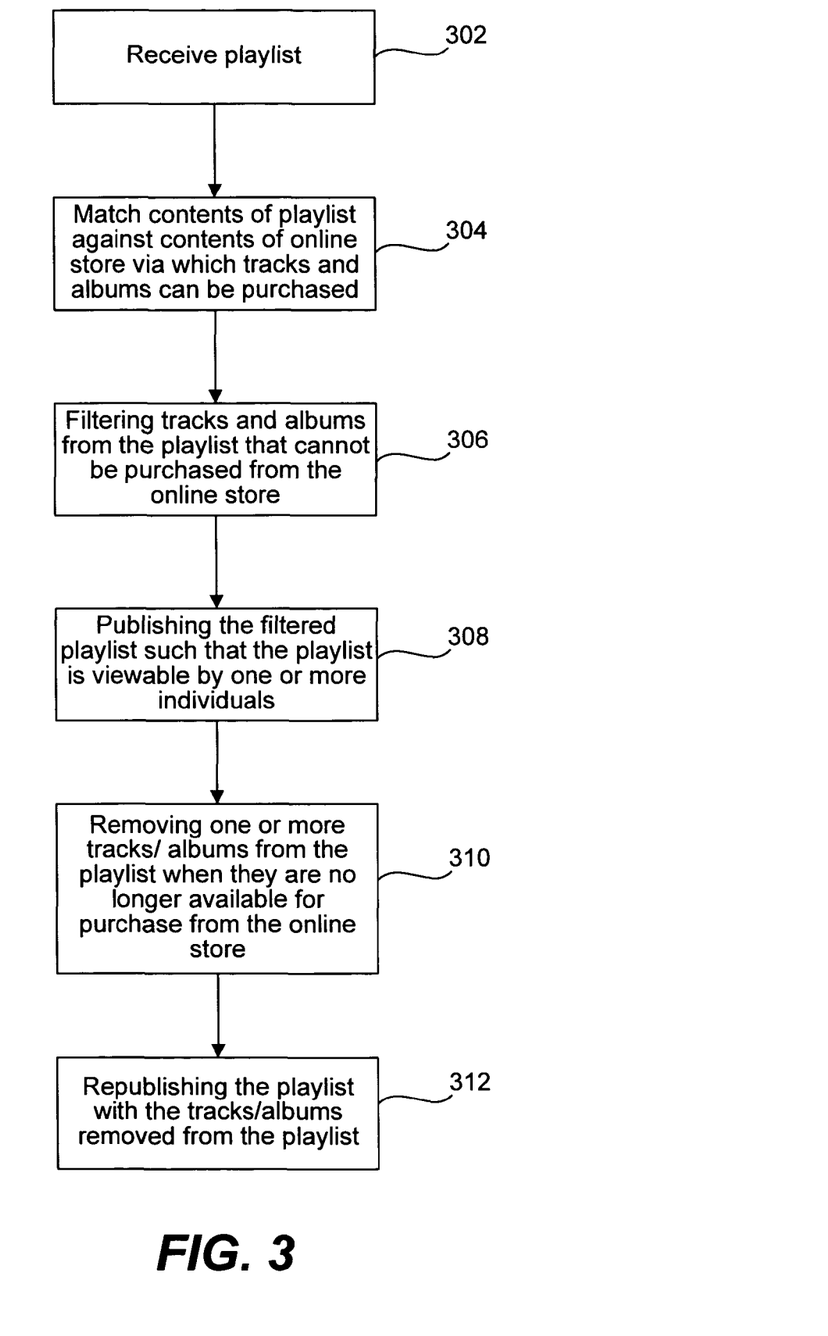
FIG. 3 is a process flow diagram illustrating a method of publishing a playlist in accordance with one embodiment of the invention.

FIG. 3 is a process flow diagram illustrating a method of publishing a playlist in accordance with one embodiment of the invention. As shown at block 302, a playlist is received. For instance, the playlist may be uploaded by a user intending to publish the playlist. In this manner, the playlist may be sent to an online store. As described above, the playlist identifies at least one of one or more tracks (e.g., songs) and one or more albums. The contents of the playlist (e.g., textual contents) are then matched against the contents of an online store via which the tracks and/or albums can be purchased at block 304. The matching may be performed in the order in which the contents are listed in the playlist. Tracks and albums that cannot be purchased from the online store are then filtered from the playlist at block 306. The filtered playlist may then be published at block 308 such that the playlist is viewable by one or more individuals. As set forth above, the contents of the playlist may be published in the order in which the contents are listed in the uploaded playlist. Similarly, when songs or albums are no longer stocked by the store, these songs and albums can be removed from the published playlist. Thus, at block 310, the tracks/albums that are no longer available for purchase from the online store may be removed from the playlist. The playlist may then be republished at block 320.

By filtering albums or songs from published playlists that cannot be purchased from the online store, only those items that can be purchased from the online store are present in the published playlists. A user may then click on any album or song playlist entry to purchase that album or song from the online store.

Other types of tracks and albums may also be filtered from a playlist prior to publishing the playlist. For instance, pornographic or obscene names associated with tracks or albums may be filtered from the playlist. In addition, the number of items in a playlist that is published may be limited and therefore the playlist may be filtered accordingly, such as through removal of the last entries in the playlist.

Figure 4:
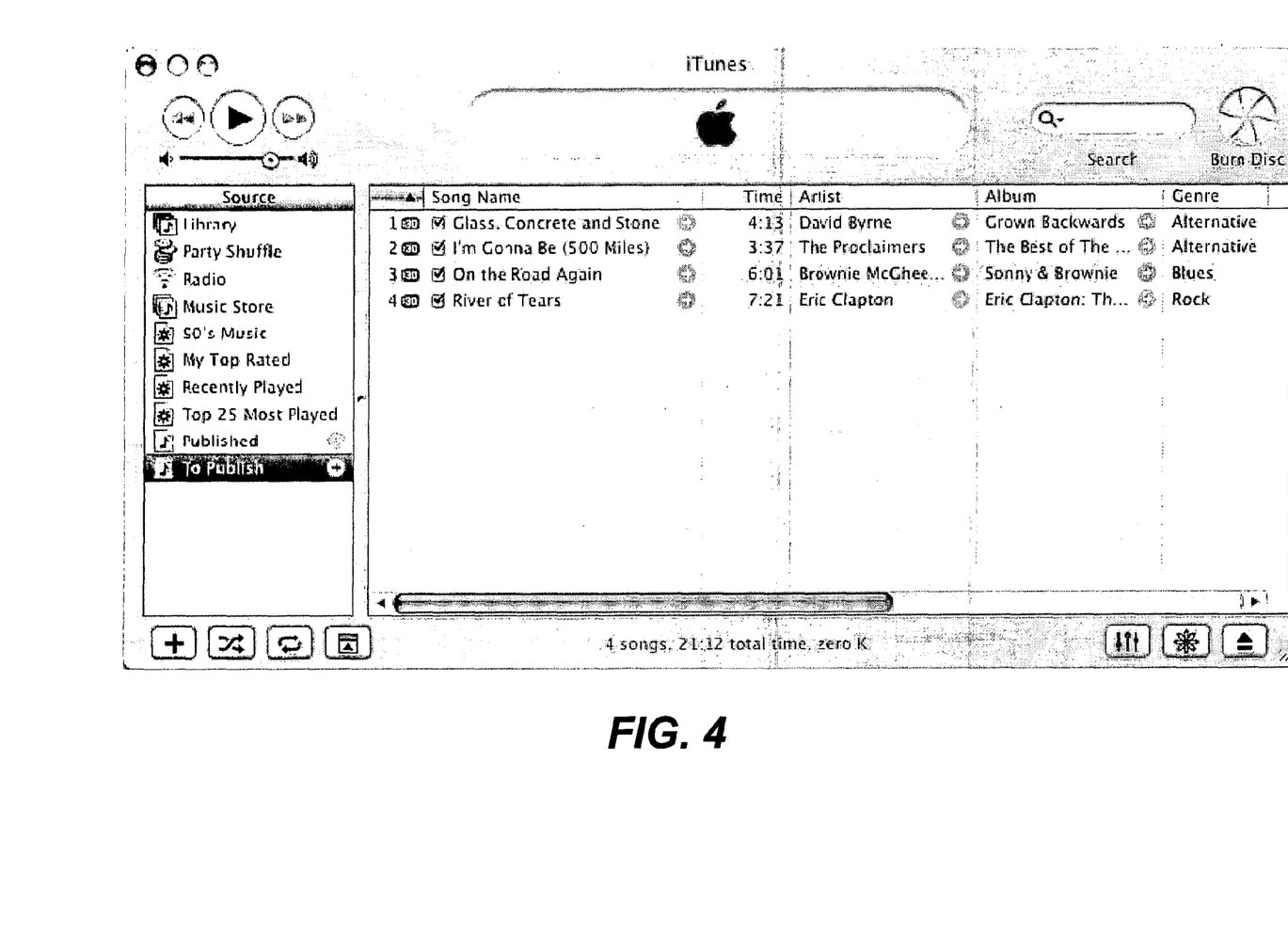
FIG. 4 is an exemplary graphical user interface that may be used to publish a playlist in accordance with one embodiment of the invention.

A user may submit a request to publish any playlist such that the playlist is viewable by one or more individuals. FIG. 4 is an exemplary graphical user interface that may be used to publish a playlist in accordance with one embodiment of the invention. As shown in FIG. 4, the user may select a publish playlist option by clicking on the "To Publish" link to submit a request to publish a particular playlist. In accordance with one embodiment, publication of playlists is account-based. Thus, the publish playlist option may be available for selection from an account page for an individual selecting the publish playlist option. Once a playlist is published, an indicator may be used to indicate that the playlist has been published. In this manner, a user may ascertain whether he or she has published a particular playlist. In addition, the published playlist may be relocated to a group of published playlists such as a group of published playlists that have been published by that user. Publication of a playlist may also be indicated by a status associated with the playlist. Specifically, the status may indicate whether the playlist is public or private. A public status may indicate that the playlist is accessible by a plurality of individuals (e.g., one or more specified individuals or the public), while a private status may indicate that the playlist is accessible only by the individual responsible for uploading the playlist. Thus, a playlist would have a status of private prior to publishing the playlist and a status of public after publishing the playlist.

Publication may be achieved in a variety of manners. For instance, publication may result in a playlist that is viewable by the public, or merely one or more individuals specified by the publisher. Thus, the publisher may notify one or more individuals of the publication, which may be achieved via a pop-up window, email or other suitable mechanism. For instance, the publisher may provide a URL, which may be provided to one or more individuals via an email indicating that the playlist can be accessed via the URL. Thus, a published playlist may be accessed via a link to a web site (e.g., iTunes Music Store). In other words, the publishing user may specify the individual(s) by whom the playlist may be viewed after the playlist is published. Of course, it is possible for the user to modify the group of individuals after the playlist has been published (e.g., by adding users to the publication group). This may be accomplished, for example, by entering the email address of the specified users into the system for automatic notification. Alternatively, each individual may be emailed directly to notify the individual of the playlist publication, and to provide the URL to the individual. Each of the specified individuals may thereafter access and view the playlist by clicking on the link provided in the email. Alternatively, a published playlist may be made available via a web site and accessed via a password which may be transmitted or provided to the intended recipients. In this manner, one or more playlists may be provided via a central server.

In addition to accessing a published playlist via a URL, the URL may also provide access to an online store from which contents of the published playlist may be purchased. Various methods of purchasing items listed in a published playlist will be described in further detail below.

Assuming playlists have been published and accessible by the public, a user may submit a search request to search the playlists. As one example, the request may be a request to display one or more playlists including a particular search term, track (e.g., song), or album. The request may be a request to display the most viewed playlists such as those including one or more specified tracks and/or albums. Similarly, the request may be a request to display the most purchased playlists such as those including one or more specified tracks and/or album. The playlists identified in the search results are then provided in response to the request. In some embodiments, permission to view the published playlists may be verified (e.g., via email address or password). As another example, a user may submit a request for those tracks and/or albums purchased by individuals who purchased a particular track or album. Thus, the identification of one or more tracks/albums purchased by the individual publishing a particular playlist may be accessed. In this manner, a user may search for and purchase similar or closely related types of music.

Figure 5:
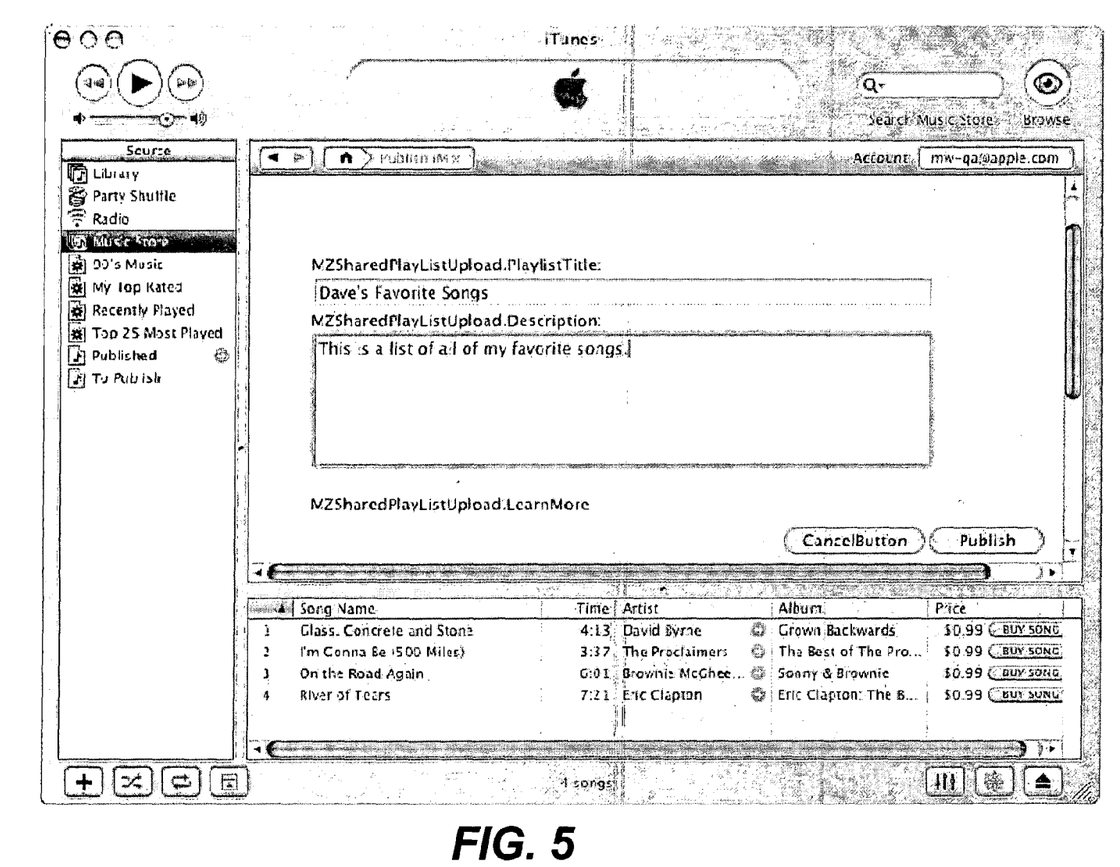
FIG. 5 is an exemplary graphical user interface that may be presented to a user that has requested publication of a playlist in accordance with one embodiment of the invention.

FIG. 5 is an exemplary graphical user interface that may be presented to a user that has requested publication of a playlist in accordance with one embodiment of the invention. Once a user has requested publication of a particular playlist, the user may provide a description and/or title of the playlist. Alternatively, a default description and/or title may be used, such as the previously established description and/or title. In addition, confirmation is obtained prior to uploading or publishing the playlist. In this example, a "Cancel Button" is provided to enable the user to confirm his or her intention to publish the playlist. If the user wishes to cancel the request to publish, the user may click on the "Cancel Button." Alternatively, the user may confirm his or her intention to publish by selecting a publish playlist option from the online store by clicking on the "Publish" button.

Upon publication, a title or description may be filtered to remove any unwanted language. For instance, any offensive or obscene language may be removed. In addition, personal information such as addresses and phone numbers may be removed.

As shown in FIG. 5, a purchase price may be provided in association with each playlist item. Specifically, a purchase price associated with the online store may be retrieved and published with the playlist item. In addition, or alternatively to a per-item purchase price, it is also possible to purchase items as a group. For instance, if it is cheaper to purchase an album including multiple tracks presented in a published playlist than it is to purchase the tracks separately, a purchase price associated with the album may be provided or obtained for the purchase transaction. Thus, the purchase of the album may be offered at the album price rather than the sum of the price of the requested tracks.

Figure 6:
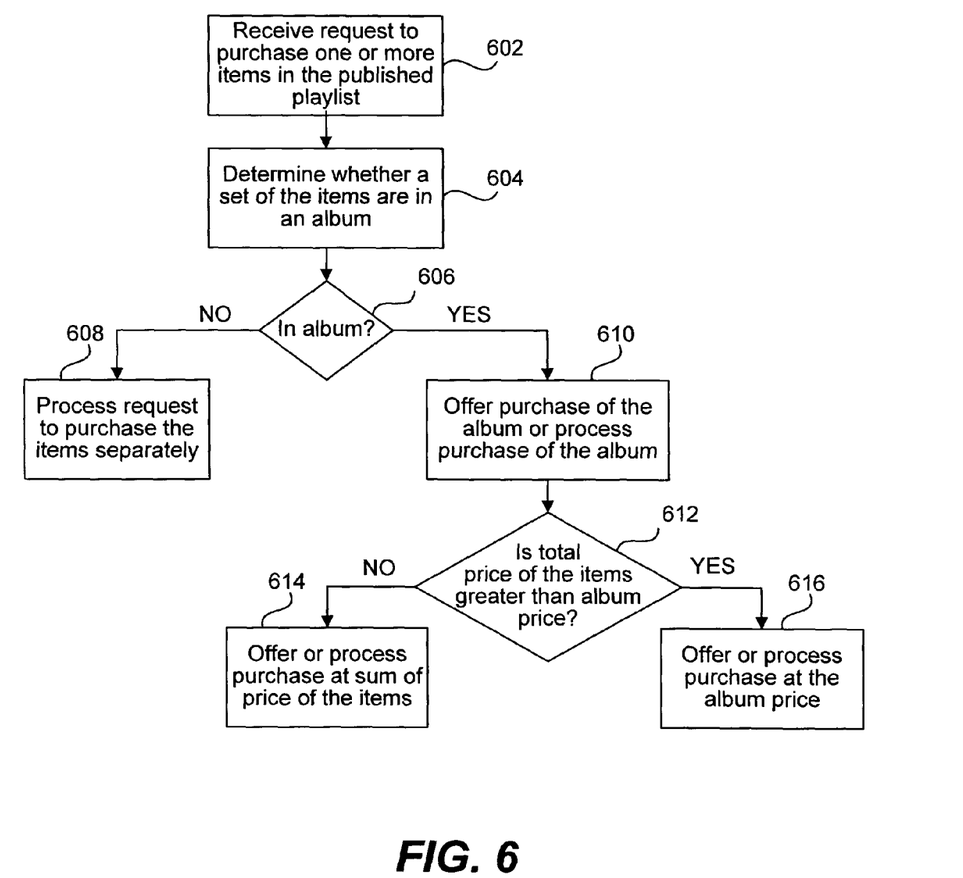
FIG. 6 is a process flow diagram illustrating a method of purchasing tracks or albums presented in a published playlist in accordance with one embodiment of the invention.

An individual accessing a published playlist may purchase one or more tracks or albums identified in the published playlist from the online store. FIG. 6 is a process flow diagram illustrating a method of purchasing tracks or albums presented in a published playlist in accordance with one embodiment of the invention. As shown at block 602, a request to purchase some or all of the tracks/albums identified in the playlist is received. It is then determined whether a set of the items in the playlist are in an album. Specifically, it is determined whether the tracks or a number of tracks (e.g., a majority of the tracks) identified in the playlist are in the same album at block 604. If the tracks or a number of tracks identified in the playlist are not in an album, the request to purchase the items is processed such that each of the items is purchased individually at block 606. Otherwise, an offer to purchase the album is provided at block 610 (or alternatively, the purchase of the album is processed). If the total price of the items (e.g., tracks) is determined not to be greater than the album price at block 612, the request to purchase the items is processed at the sum of the price of the individual items at block 614. However, if the total price of the items is greater than the album price, an offer to purchase the album (or the set of items) is provided at the album price at block 616 (or the purchase request is immediately processed at the album price).

Similarly, if a purchase request indicates a request to purchase all of the tracks/albums identified in a playlist, a discount off of the purchase price may be offered to the purchaser. This discount may be a dollar amount or a percentage amount. This promotional discount may be offered each time a user requests a purchase of an entire playlist, or a percentage (e.g., 90 percent) of a playlist.

Figure 7:
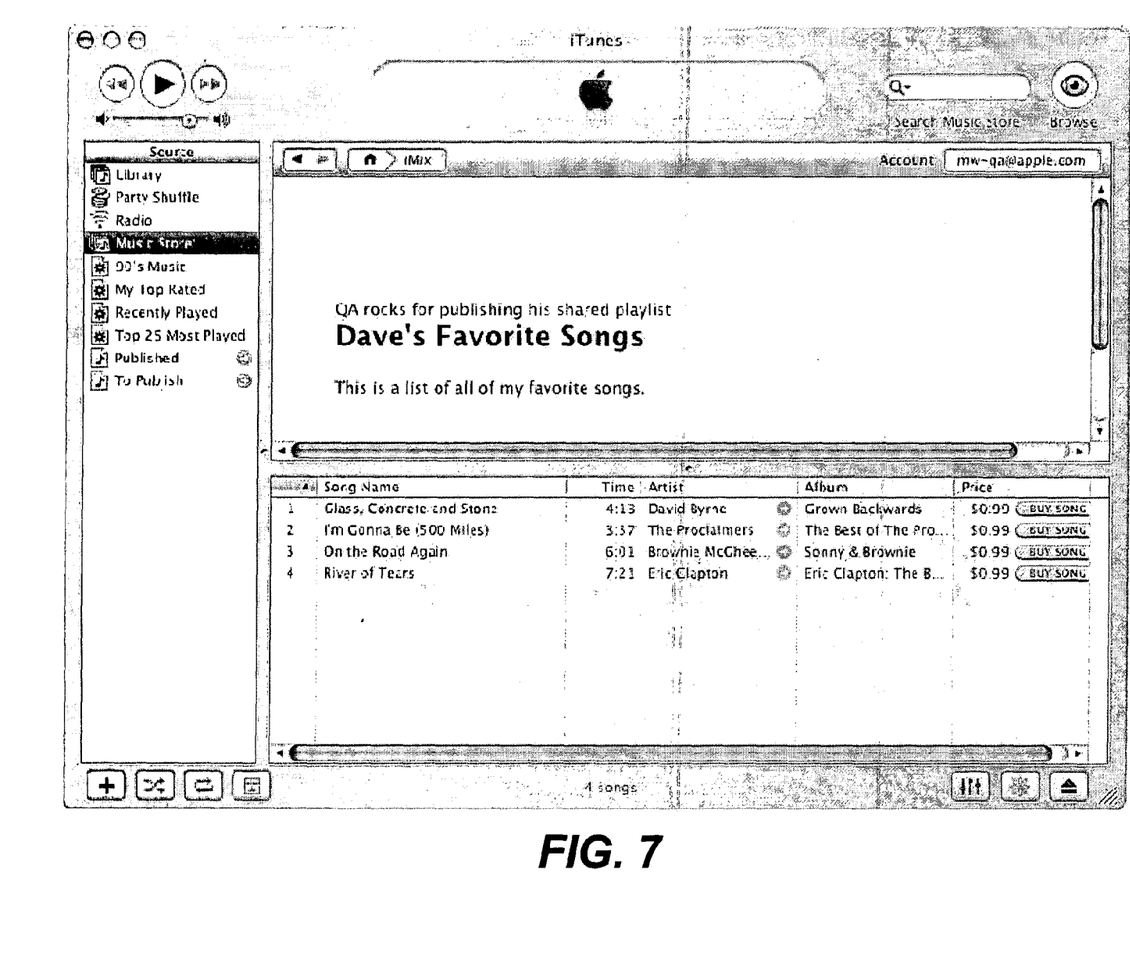
FIG. 7 is an exemplary graphical user interface that may be presented to enable a user to purchase albums or songs that are listed in a published playlist in accordance with one embodiment of the invention.

FIG. 7 is an exemplary graphical user interface that may be presented to enable a user to purchase albums or songs that are listed in a published playlist in accordance with one embodiment of the invention. In this example, a purchase price is listed for each playlist item. The user may click on the "Buy Song" icon to purchase the corresponding song. Similarly, the user may simply choose to listen to a sample for that song (if present). The sample may then be copied to a selected library (e.g., associated with the individual). Alternatively, the user may wish to listen to the user's copy of the song. Thus, a comparison of the text in the playlist entry may be compared to songs stored in the user's library present on the web site or on the user's local memory. Once a match has been found, the user's copy of the song may be played.

In order to keep track of those tracks/albums that have already been purchased, the tracks/albums in the playlist may be flagged to indicate that they have been purchased by the individual viewing the published playlist from the online store. The individual (purchaser) may be the individual who uploaded and published the playlist or, alternatively, the purchaser may be an individual accessing the published playlist (e.g., via the URL). The flagged items may be visible from the user (purchaser) account. Moreover, the tracks/albums that have been purchased may be flagged (e.g., in response to a request for flagging the purchased items). Other information may similarly be displayed for a published playlist, such as the number of people who purchased all items (e.g., albums/tracks) in a particular playlist, or the number of people who accessed a particular playlist.

Once a playlist has been published, a publishing user may wish to unpublish the published playlist. This may be accomplished, for example, by selecting an unpublish playlist option from the online store. The playlist may then be deleted from the online store, or unpublished in a similar manner via an indicator or other suitable mechanism. For instance, publishing may be performed in accordance with a publication status associated with each of the playlists, where the publication status when in a first state indicates that the corresponding playlist is to be published and when in a second state indicates that the corresponding playlist is not to be published.

An individual who has uploaded and published a particular playlist may wish to modify the published playlist. For instance, the individual may wish to add and/or remove one or more tracks/albums from the playlist. In these situations, the individual may wish to republish the playlist such that the modified playlist is uploaded and viewable by one or more individuals. Republishing may be initiated via selection of a republish playlist option. The republish playlist option, like the publish playlist option, may be selected from an online store from which contents of the published playlist can be purchased. For instance, the republish (and publish) option may be available for selection from an account page for the individual. Similarly, the republication may be achieved via the same notification mechanisms used to accomplish publication. For instance, the modified playlist may be provided via a URL such as the URL via which the playlist was initially published. Thus, the URL may provide access to an online store from which contents of the published playlist can be purchased. Moreover, an email may be sent to one or more individuals indicating that the playlist has been modified. The email may further identify a URL via which the modified playlist can be accessed. In addition, the email may include a message including additional text provided by an individual publishing the playlist. The email may be sent directly by the publisher, or indirectly by specifying or selecting one or more email addresses associated with the intended recipients of the publication/republication notice.

Publication may be implemented by transmitting an identifier associated with a playlist to the server/online store with the playlist. The identifier may also be transmitted with the playlist upon republication. The identifier may, for example, be an email address or password.

It is also possible to contact the publisher of a playlist by submitting a request to contact the publisher (i.e., individual who uploaded and published the playlist). For instance, an email may be sent to the individual, wherein the identity and email address of the individual are kept confidential. In other words, the email may be a blind email sent via the web site. In addition, emails sent by the individual in response may be received upon stripping any email address or other identifying information from the emails.

The various aspects, features, embodiments or implementations of the invention described above can be used alone or in various combinations. In addition, the media items can pertain to audio items (e.g., audio files or songs, such as for music), video items (e.g., video files or movies), or image items (e.g., photos).

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may, but need not, yield one or more of the disclosed advantages. As set forth above, one advantage of the invention is that a user may publish a playlist. Another advantage of the invention is that items listed in a published playlist may be purchased, as well as used to initiate a further search in other published playlists.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method comprising:
    receiving, at an online media store, from a first client computing device, a first playlist created and stored by a user at the first client computing device, the first playlist identifying media items selected for the first playlist by the user at the first client computing device, the first playlist being received via a network;
    receiving, from the first client computing device, a first request to publish the first playlist at the online media store;
    in response to the first request to publish the first playlist at the online media store:
        matching the media items identified in the first playlist against content items available at the online media store;
        determining that at least one of the media items does not match any of the content items available at the online media store;
        filtering the at least one of the media items from the first playlist to yield a second playlist comprising the first playlist without the at least one of the media items;
        publishing the second playlist at the online media store for access by users from other client computing devices; and
    receiving, by the online media store, from a second client computing device, a second request to purchase or download one or more media items identified in the second playlist.

2. The method as recited in claim 1, wherein receiving the first request to publish the first playlist includes receiving permissions associated with the first playlist from the user, wherein the permissions associated with the first playlist identify one or more users or groups that can access the first playlist, and wherein publishing the second playlist comprises:
  presenting the second playlist to at least one of the one or more users or groups identified by the permissions associated with the first playlist.

3. The method as recited in claim 1, further comprising:
  receiving a request to contact an individual from whom the first playlist was received; and
  sending an email to the individual, wherein an identity and email address of the individual are not provided in response to the request.

4. The method as recited in claim 1, further comprising:
  after publishing the second playlist, identifying a media item from the second playlist that has become unavailable from the online media store since the second playlist was published;
  removing the media item from the second playlist; and
  after removing the media item from the second playlist, publishing a third playlist comprising the second playlist without the media item.

5. The method as recited in claim 1, further comprising:
  filtering a media item from the first playlist based on a respective characteristic of the media item, the respective characteristic being separate from an availability status of the media item at the online media store; and
  publishing the second playlist without the media item.

6. The method as recited in claim 1, further comprising:
  unpublishing the second playlist by selecting an unpublish option at the online media store, the unpublish option being associated with the second playlist.

7. The method as recited in claim 1, wherein publishing the second playlist comprises:
  generating a uniform resource locator (URL) based on a location of the second playlist, the URL providing access to the second playlist;
  providing the URL to one or more computing devices to allow one or more respective individuals to access the second playlist via the URL.

8. The method as recited in claim 1, wherein receiving the first playlist and the first request to publish are both in response to a user selection of an option to publish the first playlist, the option to publish, when selected, causing the first client computing device to transmit both the first playlist and the first request to publish the first playlist to the online media store.

9. The method as recited in claim 1, wherein the first playlist and the first request to publish the first playlist are both received from a media application operating at the first client computing device during a same application session at the first client computing device.

10. The method as recited in claim 1, wherein publishing the second playlist further comprises, for each media item associated with the second playlist, presenting a respective indication in the second playlist of a number of individuals who have accessed or purchased the media item from the online media store.

11. The method as recited in claim 10, wherein each media item associated with the second playlist includes a purchase price.

12. The method as recited in claim 1, further comprising:
  flagging an entry in the second playlist indicating at least one media item associated with the second playlist was purchased by an individual viewing the second playlist from the online media store.

13. The method as recited in claim 1, further comprising restricting user access to the second playlist by creating a publishing group defining a selected set of users who may access the second playlist, wherein the publishing group restricts access to the second playlist to those users from the selected set of users defined in the publishing group.

14. The method as recited in claim 13, further comprising adding a selected user to the publishing group to enable access to the second playlist by the selected user.

15. The method as recited in claim 1, wherein the second request is to purchase, from the online store, all media items associated with the second playlist, the method further comprising:
  processing the second request to purchase all of the media items associated with the second playlist; and
  providing all of the media items to the second client computing device associated with the second request.

16. The method as recited in claim 1, further comprising:
  processing the second request to purchase or download the one or more media items;
  providing the one or more media items to the second client computing device associated with the second request; and
  presenting an indication in the second playlist that the one or more media items were purchased.

17. The method as recited in claim 1, wherein the first playlist and the second request are received together.

18. The method as recited in claim 1, wherein the second request is to purchase all media items associated with the second playlist, the method further comprising:
  processing the second request to purchase all of the media items in the second playlist at a group cost that is different than a combined cost of each individual media item in the second playlist; and
  providing all of the media items to the second client computing device associated with the second request.

19. The method as recited in claim 1, wherein the second request is to purchase all media items associated with the second playlist, the method further comprising:
  processing the second request to purchase all of the media items in the second playlist at a group cost that is different than a combined cost of each individual media item in the second playlist;
  providing all of the media items to the second client computing device associated with the second request; and
  flagging all of the media items in the second playlist as having been purchased from the online media store.

20. The method as recited in claim 1, wherein publishing the second playlist includes receiving an instruction to publish the second playlist at the online media store, the instruction being received from a client media application at the first client computing device in response to a user selection of a publish playlist option from the client media application at the first client computing device, wherein the user selection of the publish playlist option triggers the first request to publish the first playlist.

21. The method as recited in claim 20, further comprising:
  unpublishing the second playlist;
  republishing the second playlist to yield a republished playlist; and
  generating an address for accessing the republished playlist.

22. The method as recited in claim 1, further comprising:
  receiving a modification of the second playlist; and
  republishing the second playlist with the modification at the online media store.

23. The method as recited in claim 22, wherein the modification comprises a change to a number of items in the second playlist.

24. The method as recited in claim 22, wherein publishing the second playlist includes generating a uniform resource locator (URL) for providing access to the second playlist, and republishing the second playlist with the modification includes providing the second playlist with the modification at the URL.

25. The method as recited in claim 24, wherein the URL provides access to the online media store, and wherein contents of the second playlist can be purchased from the online media store through the URL.

26. The method as recited in claim 22, further comprising:
sending an email to one or more individuals indicating that the second playlist has been modified, wherein the email identifies a URL via which the modified playlist can be accessed by the one or more individuals.

27. The method as recited in claim 1, wherein the media items comprise one or more tracks or albums, wherein each of the tracks or albums is identified by at least one of a name, artist, and album.

28. The method as recited in claim 1, the media items comprise one or more tracks or albums, wherein each of the tracks or albums has a personal rating associated therewith.

29. The method as recited in claim 1, wherein the second playlist has a status indicating that the second playlist is public or private, wherein when the status indicates that the second playlist is public the second playlist is accessible by a plurality of individuals and when the status indicates that the second playlist is private the second playlist is accessible only by an individual responsible for uploading the first playlist, wherein the second playlist has a status of private prior to publishing the second playlist and has a status of public after publishing the second playlist.

30. The method as recited in claim 1, further comprising:
specifying at least one of a description and title of the second playlist.

31. The method as recited in claim 30, further comprising:
filtering at least one of an address or a phone number from the description.

32. The method as recited in claim 1, wherein the media items associated with the first playlist are selected via a media client application at the first client computing device, from a local media library stored at the first client computing device.

33. The method as recited in claim 32, further comprising:
offering a discount from a total price of a purchase associated with the second request when the second request is a custom request to purchase a specified percentage of media items in the second playlist.

34. At least one computer readable medium comprising instructions which, when executed by at least one processor, cause the at least one processor to:
present, via a graphical user interface at a client computing device, a plurality of media items stored on a media library at the client computing device;
generate, via the graphical user interface, a first playlist of media items selected from the plurality of media items stored on the media library at the client computing device;
present, via the graphical user interface, the first playlist and an option for publishing the first playlist;
in response to a user selection of the option for publishing the first playlist, send, to one or more servers, from the graphical user interface, the first playlist and a request to publish the first playlist at the one or more servers;
present, via the graphical user interface, a second playlist published at the one or more servers in response to the request, the second playlist comprising the media items in the first playlist and excluding at least one of the media items in the first playlist, the at least one of the media items in the first playlist being filtered from the second playlist based on a determination that the at least one of the media items does not match any content items available at the one or more servers; and
present an indication of a purchase price determined by the one or more servers for one or more media items in the second playlist.

35. The at least one computer readable medium of claim 34, wherein each media item in the second playlist is presented with an indication of a respective purchase price determined by the one or more servers for the media item.

36. The at least one computer readable medium of claim 34, storing additional instructions which, when executed by the at least one processor, cause the at least one processor to flag one or more entries in the second playlist indicating one or more tracks or albums that have been purchased by an individual viewing the second playlist from the one or more servers.

37. The at least one computer readable medium of claim 34, wherein the first playlist has a first status of private prior to the second playlist being published and the second playlist is associated with a second status of public after the second playlist is published.

38. The at least one computer readable medium of claim 34, wherein the graphical user interface comprises a media playback application running at the client computing device, wherein the media playback application enables a user to add media items to the first playlist, remove media items from the first playlist, play media items in the first playlist, name the first playlist, and publish the first playlist on the one or more servers.

39. The at least one computer readable medium of claim 34, storing additional instructions which, when executed by the at least one processor, cause the at least one processor to:
modify the second playlist after publishing the second playlist; and
republishing the second playlist.

40. The at least one computer readable medium of claim 34, wherein the graphical user interface is associated with a media application at the client computing device, wherein the first playlist is automatically generated by the media application at the client computing device based on one or more criteria comprising at least one of a genre or an artist, the at least one computer readable medium storing additional instructions which, when executed by the at least one processor, cause the at least one processor to:
after publishing the second playlist, receive a request to grant access to the second playlist to a specific user that currently does not have permissions to access the second playlist;
in response to the request, modify permissions associated with the second playlist to add permissions granting the specific user access to the second playlist via the one or more servers; and
generate a notification indicating that the specific user has been granted access to the second playlist.

41. A system comprising:
at least one processor; and
at least one computer-readable storage medium having stored therein instructions which, when executed by the at least one processor, cause the at least one processor to:

receive, from a first client computing device, a first custom playlist generated by the first client computing device and comprising media items selected at the first client computing device, wherein the first custom playlist is received via a network;

receive a request to publish the first custom playlist at the system, the request being received from the first client computing device;

in response to the request to publish the first custom playlist at the system:

match the media items in the first custom playlist against contents of the system;

determine that at least one media item from the media items in the first custom playlist is not available at the system; and filter the at least one media item from the first custom playlist to yield a second custom playlist comprising the media items in the first custom playlist without the at least one media item that is not available at the system; and publish the second playlist such that the second playlist is viewable at the system by one or more client computing devices; and present an indication of a purchase price determined by the system for one or more media items in the second playlist.

42. The system of claim 41, the at least one computer-readable storage medium storing additional instructions which, when executed by the at least one processor, cause the at least one processor to:

remove an item from the second playlist when the item is no longer available for purchase or download from the system to yield a modified playlist, the item comprising at least one of a track or an album; and publishing the modified playlist.

43. The system of claim 41, the at least one computer-readable storage medium storing additional instructions which, when executed by the at least one processor, cause the at least one processor to flag one or more entries in the second playlist indicating one or more tracks or albums that have been purchased by an individual viewing the second playlist from the system.

44. The system of claim 41, the at least one computer-readable storage medium storing additional instructions which, when executed by the at least one processor, cause the at least one processor to receive a second request to purchase at least one of a track or an album in the second playlist from the system.

45. An online media store comprising:

at least one processor; and at least one memory having stored therein instructions which, when executed by the at least one processor, cause the at least one processor to:

receive, from a first client computing device, a first playlist created and stored by a user at the first client computing device, the first playlist identifying media items selected for the first playlist by the user at the first client computing device, the first playlist being received via a network;

receive, from the first client computing device, a first request to publish the first playlist at the online media store;

in response to the first request to publish the first playlist at the online media store:

filter the first playlist by removing one or more of the media items from the first playlist that are not available for download or purchase from the online media store, to yield a second playlist comprising the first playlist without the one or more of the media items from the first playlist that are not available for download or purchase from the online media store; and publish the second playlist at the online store to provide access to the second playlist by one or more users from other client computing devices via the online media store, the one or more users being identified in a permissions group which grants the one or more users in the permissions group access to the second playlist published at the online media store;

receive, from at least one second client computing device from the other client computing devices, a second request to purchase or download at least one media item from the second playlist; and present on the second playlist published a visual indication that the at least one media item has been purchased or downloaded from the online media store.

46. An online media store as recited in claim 45, wherein the filtering comprises:

matching contents of the first playlist against contents at the online media store;

determining that the one or more of the media items from the first playlist are not available at the online media store, to yield a determination that the one or more of the media items are not available; and based on the determination that the one or more of the media items are not available, filtering the one or more of the media items from the first playlist to yield the second playlist.

47. The online media store as recited in claim 45, the computer-readable storage medium having stored therein additional instructions which, when executed by the at least one processor, cause the at least one processor to:

receive, by the online media store, a third request to purchase all media items in the second playlist.

48. The online media store as recited in claim 47, the computer-readable storage medium having stored therein additional instructions which, when executed by the at least one processor, cause the at least one processor to:

determine one or more media items associated with the third request are not in a same album, to yield a purchase determination; and based on the purchase determination and the third request, process a respective purchase of each media item from the media items in the second playlist individually.

49. The online media store as recited in claim 47, the computer-readable storage medium having stored therein additional instructions which, when executed by the at least one processor, cause the at least one processor to:

determine that all of the media items associated with the third request are in a same album, to yield a purchase determination; and based on the purchase determination and the third request, offer a purchase of the same album.

50. The online media store as recited in claim 47, the computer-readable storage medium having stored therein additional instructions which, when executed by the at least one processor, cause the at least one processor to:

determine whether a majority of the media items associated with the third request are in a same album.

51. The online media store as recited in claim 50, wherein when it is determined that the majority of the media items are in the same album, offering a purchase of the same album.

52. The online media store as recited in claim 51, wherein the purchase of the same album is offered at an album price that is different than a combined cost of all individual items in the same album.

53. The online media store as recited in claim 52, wherein the purchase of the same album is offered at the album price when a total price of all individual items in the same album is greater than the album price.

54. The online media store as recited in claim 47, the computer-readable storage medium having stored therein additional instructions which, when executed by the at least one processor, cause the at least one processor to: offer a discount from a total price of the purchase when the purchase is for all of the media items in the second playlist.

55. The online media store of claim 45, the at least one computer-readable storage medium storing additional instructions which, when executed by the at least one processor, cause the at least one processor to receive a third request to purchase at least one of a track or an album in the second playlist from the online media store.

56. The online media store of claim 45, the at least one computer-readable storage medium storing additional instructions which, when executed by the at least one processor, cause the at least one processor to send an email to one or more users indicating that the second playlist has been modified to yield a modified playlist, wherein the email identifies a URL via which the modified playlist can be accessed.

* * * * *